April 17, 1951   H. J. SHIVELL ET AL   2,549,394
LOOM PICKER
Filed July 27, 1948
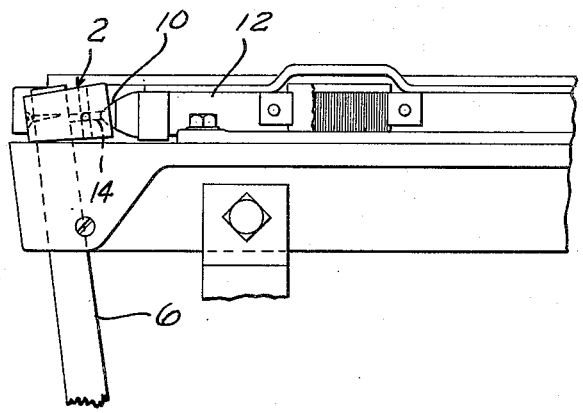
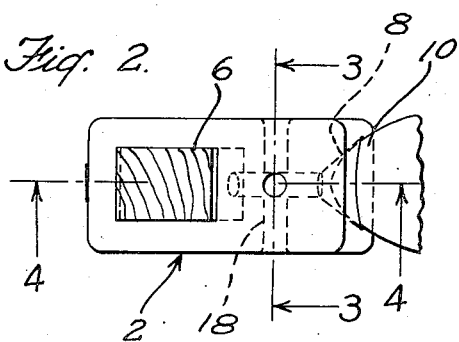
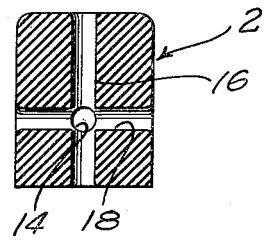
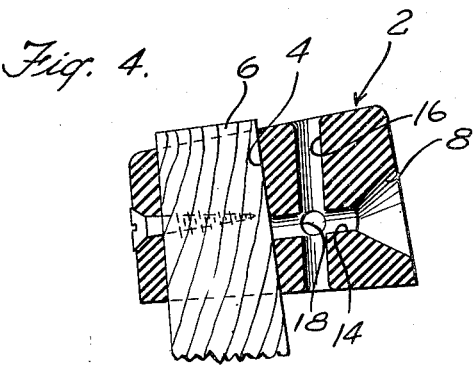
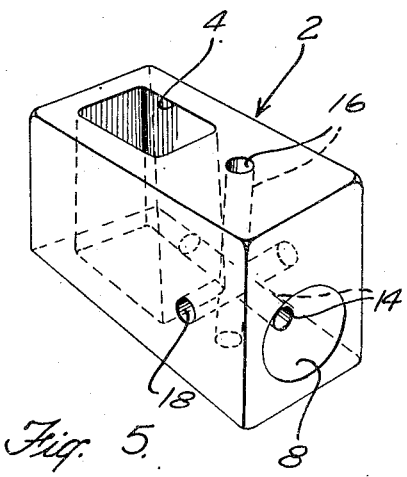
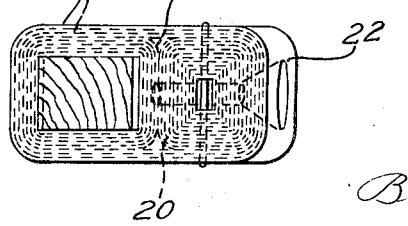
INVENTORS
HOMER J. SHIVELL
PHILIP J. SHIVELL
BY
Blair, Curtis & Hayward.
ATTORNEYS Patented Apr. 17, 1951

2,549,394

UNITED STATES PATENT OFFICE 2,549,394

LOOM PICKER

Homer J. Shivell and Philip J. Shivell, Kingsport, Tenn.

Application July 27, 1948, Serial No. 40,904

13 Claims. (Cl. 139—159)

This invention relates to pickers for looms and has for its general object so to modify the construction of the pickers used with the picker sticks of looms as to increase both the effectiveness of the operation thereof and the overall life of such pickers.

Formerly most pickers were made of leather. More recently, however, there has come into use a picker made of rubber which has almost completely supplanted the leather pickers. As usually constructed, these rubber pickers have each a tapered recess in the shuttle-engaging face into which the point of the shuttle enters. Because of the nature of the material employed in the construction of the rubber pickers such an air-excluding fit of the shuttle point in the recess is produced by the entry of the point thereinto that when the shuttle starts to move out of the recess the partial vacuum created tends to pull the metal shuttle point out of the shuttle.

A further trouble experienced with the use of the rubber pickers is that the repeated impacts of the shuttle against the picker generates considerable heat and this causes damage both to the shuttle and to the picker, this being, of course, especially true on what is known as the eye end of the shuttle and the part of the picker that this end engages.

Still another difficulty encountered in the use of rubber pickers is that, if vulcanized hard enough so that they are suitable for the rough usage to which they are subjected, there is not sufficient cushion effect in the head.

Since, however, the rubber pickers can be manufactured for much less than the cost of leather pickers, they have come into quite general use. A particular object of the present invention, therefore, is so to modify the construction of such pickers that the difficulties above enumerated, which have been encountered in the use thereof, may be more or less overcome. To this end the invention aims: First, to modify the construction of rubber or other plastic pickers so as to eliminate the danger of the creation of a partial vacuum when the shuttle point enters the point-receiving recess in the picker; secondly, to provide for ventilation through the picker in such manner that the heat generated by the impact of the shuttle upon the picker may be dissipated, and, thirdly, so to arrange the ventilation that the ventilating ducts or vents may modify the physical structure of the picker to such an extent as to produce the desired cushion effect.

An important feature of the invention is the provision of a hole in the picker which extends from the base of the tapered recess in the impact face of the picker along the line of thrust of the shuttle and the provision of one or more holes which extend laterally from this central hole through a side or sides of the picker. By providing a plurality of such lateral holes extending from the central hole through the sides of the picker and arranging these holes substantially equiangularly about the axis of the central hole, we have found that the reduction in solidity or compactness of the picker thus produced will provide the desired cushion effect, which is another important feature of the invention. A third important feature of the invention is obtained as an incident to the provision for a cushioning effect and for relieving any tendency to a vacuum action, and that is the ventilation of the picker in the region of the impact face to dissipate the heat generated there.

Other objects, important features and advantages of the invention to which reference has not hereinabove specifically been made will appear hereinafter when the following description and claims are considered in connection with the accompanying drawings, in which—

Figure 1 is a detail side elevation of that portion of a loom in which the picker of the present invention is used, this view showing a portion of the picker stick, the picker and a portion of the shuttle;

Figure 2 is a detail plan view on a somewhat larger scale of the picker and shuttle end shown in Fig. 1;

Figure 3 is a section on the line 3—3 of Fig. 2;

Figure 4 is a section on the line 4—4 of Fig. 2;

Figure 5 is a perspective phantom view of the picker of the present invention; and Figure 6 is a view similar to Figure 2 of another embodiment of the invention.

In the illustrative embodiment of the invention the picker is shown as molded in one piece from a suitable plastic such as rubber, or preferably laminated wrappings of rubber coated or impregnated fabric, vulcanized in the usual way. The rear portion of the picker is provided with the usual transverse tapered opening 4 to receive the picker stick 6.

In the impact face of the picker 2 there is provided a tapered recess 8 of substantially the shape of the shuttle point 10, the recess shown in Figures 2 and 4, particularly, being cup-shaped. Extending from the base of the recess 8 in the direction of thrust of the shuttle 12 is a hole 14 which serves several purposes, this hole having the function of the corresponding hole disclosed in the patent of Homer J. Shivell, No. 2,308,393, granted January 12, 1943, as well as forming a communication with the transverse vent holes 16 and 18 herein shown. The hole 14 preferably extends to and communicates with the picker stick hole 4.

As shown particularly in Figures 2 and 4, the recess 8 is formed with its periphery or mouth of such diameter that it contacts the nose of the shuttle before any other part, and the remainder of the recess is designed so that it progressively contacts the shuttle from the periphery toward the inner opening. This has several important advantages: In the first place, this results in the greatest distortion resulting from absorption of the impact energy being near the surface of the picker where the heat generated can be most readily dissipated. In the second place, the greatest distortion thus comes in the widest area and in the portion adjacent the corner where it can be most readily accommodated without damage to the material of the picker. In the case where the outside of the picker is covered with a layer of high stiffness, impact-, abrasion-, and fatigue-resistant rubber, such as automobile tread stock, this also permits this maximum distortion to occur in the rubber and reinforcing fabric to be used in a part of the structure which is less subject to such distortion. In the third place, by having the outer face first contact the shuttle, the distortion is only partly by spreading the material with a tendency to tear, and is to a large extent by dragging the outer periphery of the hole downward into the hole, thus combining a tensile stretch with the compressive action and giving a more efficient cushioning. In the fourth place, the pumping action of the present invention is thus made most effective, because the shuttle seals the outer periphery on the initial contact and then on further compression it expels the air from the recess below out through the vent openings, and likewise, on its release it sucks air in through the openings and fills the bottom of the recess before the shuttle is released from the outer periphery.

As shown particularly in Figures 3, 4 and 5, the vent holes 16 and 18 extend entirely through the picker at right angles to each other and each intersects the hole 14. It will thus be seen that not only do the holes 16 and 18 provide vents for relieving any vacuum which might tend to be created in the recess 8 by the entry of the shuttle point 10 thereinto, but the circulation of air through these holes 16 and 18 and through the hole 14 produced by the compression of the picker material resulting from the shuttle impacts and the resilient return to its original shape tends to dissipate any heat resulting from such impacts.

It will further be seen that the location of these holes 16 and 18 at right angles to each other or at angular spacings about the axis of the hole 14 and their location in a plane transverse to the impact axis of the picker tend to effect such a reduction in the solidity or compactness of the picker material as to produce a cushioning effect.

The holes 14, 16 and 18 can be formed by mandrels either in the wrapping of the rubberized fabric from which the material is made, or by mandrels inserted into the mold if the picker is made entirely from a plastic material, or by drilling after a solid molded picker head has been formed.

Instead of making relatively large holes in this manner, it is also within the scope of my invention to use a pervious section of material which provides for inhaling and exhaling of air in the manner specified. Thus, I may use any pervious fibrous material such as leather, felt, layers or rolls of fabric, etc. In general, it is desirable, where layers of fabric are used, to have them mechanically secured together, as by stitching so that they are securely held in place, and the outermost layers should be impregnated and/or coated with rubber so as to be securely cemented and anchored into the integral body of material. This is shown in Figure 6 of the drawings, wherein the pervious cushioning block 20 is provided within the outer wrapping 21 and between the face 22 and the inner wrapping 23 around the hole 4. The body of this block, as shown in Figure 6, is advantageously a roll of resilient fabric, such for example, as nylon or cotton, and a layer of rubberized fabric is sewn onto the outer end portion so that when the roll is formed, the outside of the roll is securely anchored to the remainder of the picker head. Advantageously, the successive turns of the roll are also mechanically secured to one another by sewing or by inserting staples so that the roll cannot telescope out from either end under pressure. Instead of this, a very advantageous buffer block can be formed by a roll or layers of flesh split leather or a block of wool felt, etc.

Although the embodiment of the invention herein shown and described has been found to provide a practicable solution of the problems' to the solution of which the invention is directed, it will be understood that modifications may be made within the scope of the appended claims.

What is claimed as new is:

1. A loom picker having its shuttle-engaging face provided with a shuttle point receiving tapered recess, said picker having therein a hole communicating with the base of said recess and extending into the picker along the line of the shuttle thrust and also having therein a vent hole extending from said first-mentioned hole through a side of said picker.

2. A loom picker according to claim 1 in which the vent hole extends through opposite sides of the picker.

3. A loom picker according to claim 1 in which there are a plurality of vent holes substantially equiangularly spaced about the axis of the first-mentioned hole.

4. A loom picker according to claim 1 in which the vent hole is substantially normal to the axis of the first-mentioned hole.

5. A loom picker according to claim 1 formed of a resilient plastic.

6. A loom picker according to claim 1 molded in one piece from rubber.

7. A loom picker according to claim 1 in which the picker has its outer face of impact and abrasion and fatigue resistant rubber and a reinforcing cushion thereneath of fibrous material.

8. A loom picker according to claim 7 in which the reinforcing cushion is a laminated core of rubberized textile fabric.

9. A loom picker having its shuttle-engaging face provided with a shuttle point receiving tapered recess, said picker having its outer face of impact and abrasion and fatigue resistant rubber with a reinforcing cushion thereneath of pervious fibrous fabric, said picker having also therein a hole communicating with the base of said recess and extending into the picker along the line of the shuttle thrust, and also having therein a vent hole extending from said first-mentioned hole through a side of said picker.

10. A loom picker according to claim 9 in which the fibrous fabric is a mass of interentangled resilient fibers with the spaces between them substantially open.

11. A loom picker according to claim 9 in which the fibrous fabric is a textile fabric with a plurality of layers mechanically secured in overlying relation.

12. A loom picker having its shuttle-engaging face provided with a shuttle point receiving tapered recess, said recess having sides which converge more acutely than the corresponding sides of said shuttle point, said picker having therein a hole communicating with the base of said recess and extending into the picker along the line of the shuttle thrust and also having therein a vent hole extending from said first-mentioned hole through a side of said picker.

13. A loom picker having its shuttle-engaging face provided with a shuttle point receiving tapered recess, whose outer rim is adapted to engage a shuttle before any other part thereof, the sides of said recess diverging from the end of the shuttle when the shuttle is engaged with said rim, said picker further having therein a hole communicating with the base of said recess and extending into the picker along the line of the shuttle thrust, and also having therein a vent hole extending from said first-mentioned hole through a side of said picker.

HOMER J. SHIVELL.
PHILIP J. SHIVELL.

REFERENCES CITED

The following references are of record in the file of this patent:

UNITED STATES PATENTS

| Number | Name | Date |
| --- | --- | --- |
| 1,415,161 | Dubois | May 9, 1922 |
| 1,904,316 | Kullman | Apr. 18, 1933 |
| 2,275,728 | Carter | Mar. 10, 1942 |
| 2,308,393 | Shivell | Jan. 12, 1943 |
| 2,468,102 | Nelson | Apr. 26, 1949 |
| 2,501,624 | Tifft | Mar. 21, 1950 |